United States Patent
Segalle

(10) Patent No.: US 7,755,609 B2
(45) Date of Patent: Jul. 13, 2010

(54) ORTHOPEDIC COMPUTER MOUSE

(76) Inventor: Julio Abel Segalle, Rua Ayres da Cunba, 378, 06706-165 Cotia-SP (BR)

( * ) Notice: Subject to any disclaimer, the term of this patent is extended or adjusted under 35 U.S.C. 154(b) by 754 days.

(21) Appl. No.: 10/592,862

(22) PCT Filed: Jun. 25, 2004

(86) PCT No.: PCT/BR2004/000103

§ 371 (c)(1),
(2), (4) Date: Feb. 20, 2007

(87) PCT Pub. No.: WO2005/088432

PCT Pub. Date: Sep. 22, 2005

(65) Prior Publication Data

US 2008/0165123 A1    Jul. 10, 2008

(30) Foreign Application Priority Data

Mar. 18, 2004 (BR) ................................. 8400186 U

(51) Int. Cl.
G09G 5/08    (2006.01)
G06F 3/033    (2006.01)

(52) U.S. Cl. .................................................. 345/163

(58) Field of Classification Search ........... 345/163–166
See application file for complete search history.

(56) References Cited

U.S. PATENT DOCUMENTS

| | | |
|---|---|---|
| 5,648,798 A | 7/1997 | Hamling |
| 5,894,303 A | 4/1999 | Barr |
| 5,949,406 A * | 9/1999 | Kress .......................... 345/163 |
| 2001/0052894 A1* | 12/2001 | Segalle ........................ 345/163 |
| 2002/0084985 A1 | 7/2002 | Hesley et al. |
| 2002/0118174 A1* | 8/2002 | Rodgers ...................... 345/163 |
| 2002/0154095 A1* | 10/2002 | Whitcomb .................. 345/163 |
| 2004/0017358 A1 | 1/2004 | Kuo |
| 2004/0145566 A1* | 7/2004 | Tsai ............................ 345/163 |

FOREIGN PATENT DOCUMENTS

| | | | |
|---|---|---|---|
| DE | 298 22 235 U1 | | 8/1999 |
| DE | 201 16 859 U1 | | 1/2002 |
| JP | 2000181620 A | * | 6/2000 |
| WO | WO-99/16014 A1 | | 4/1999 |
| WO | WO-00/23979 A1 | | 4/2000 |

* cited by examiner

*Primary Examiner*—Amr Awad
*Assistant Examiner*—Stephen G Sherman
(74) *Attorney, Agent, or Firm*—Birch, Stewart Kolasch, & Birch LLP

(57) ABSTRACT

An orthopedic computer mouse including a flat base substantially shaped as a parallelogram, the mouse having a central region substantially shaped as a hemispheric dome, separated from a lateral recess wherein the thumb is fitted by a projection feature that ensures the pincer position assumed by the hand of the user, and containing a standard-sized body which houses control buttons electronic components and the motion sensing means. An elongating attachment supports the proximal region of the hand of the user and presents a projection feature. Both elements are attachable to the body by mutually cooperating latching elements. The elongating attachments and the projection features are manufactured to accommodate a wide range of hand sizes.

5 Claims, 4 Drawing Sheets

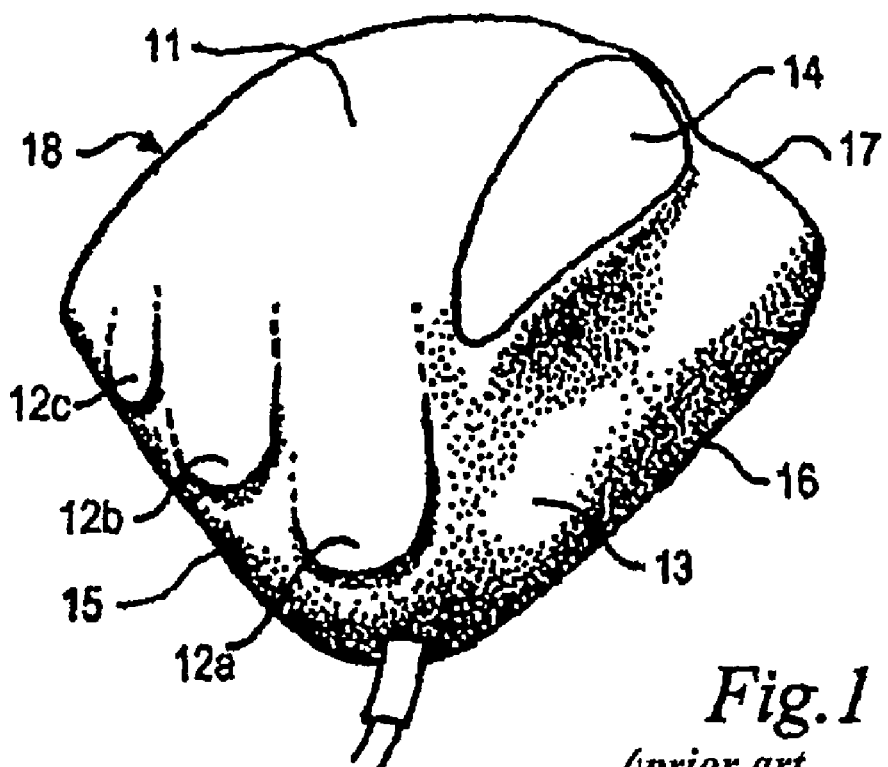
Fig. 1
(prior art PI 9903113)
Fig. 2
(prior art PI 9903113)
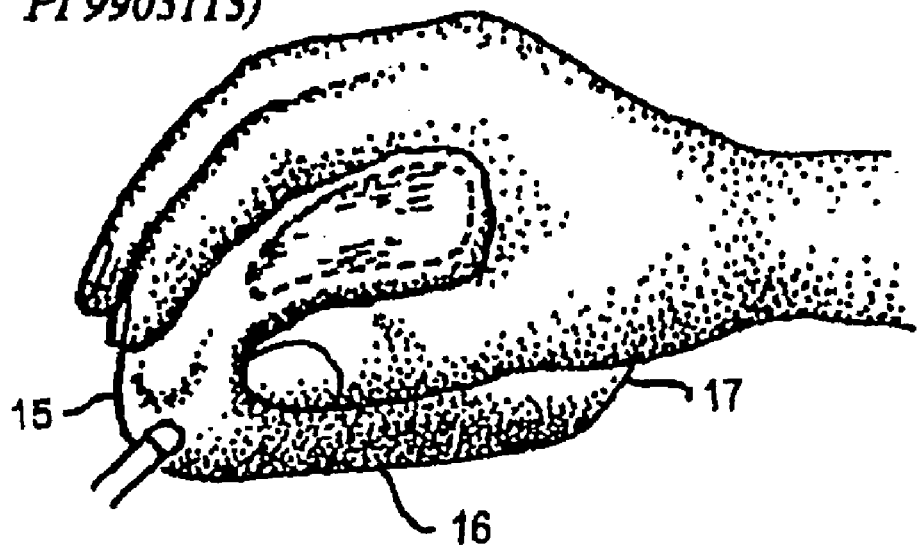

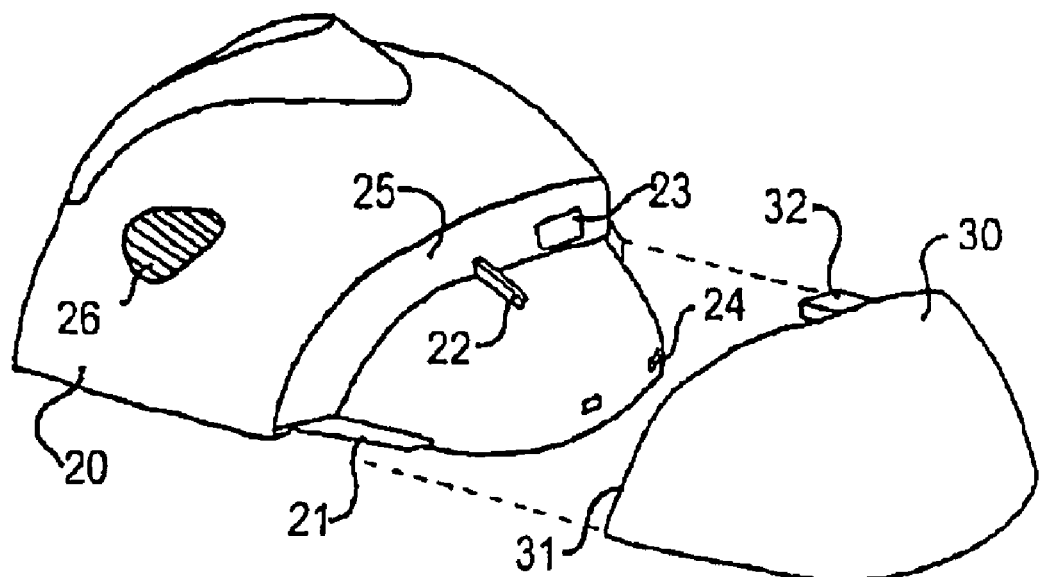
Fig.3
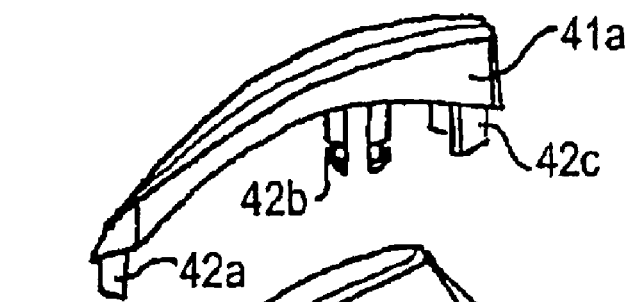
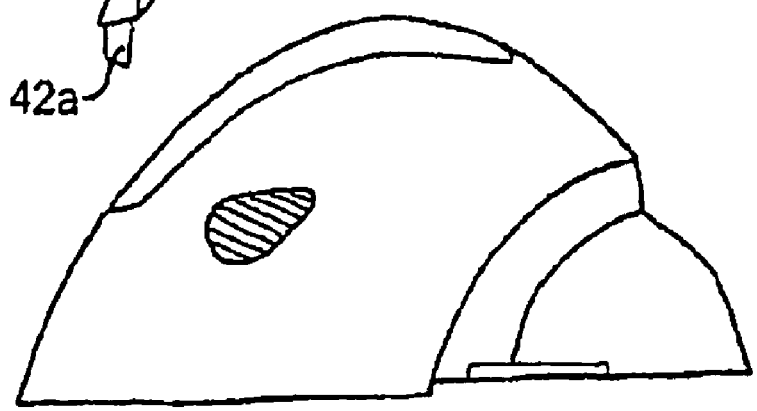
Fig.4

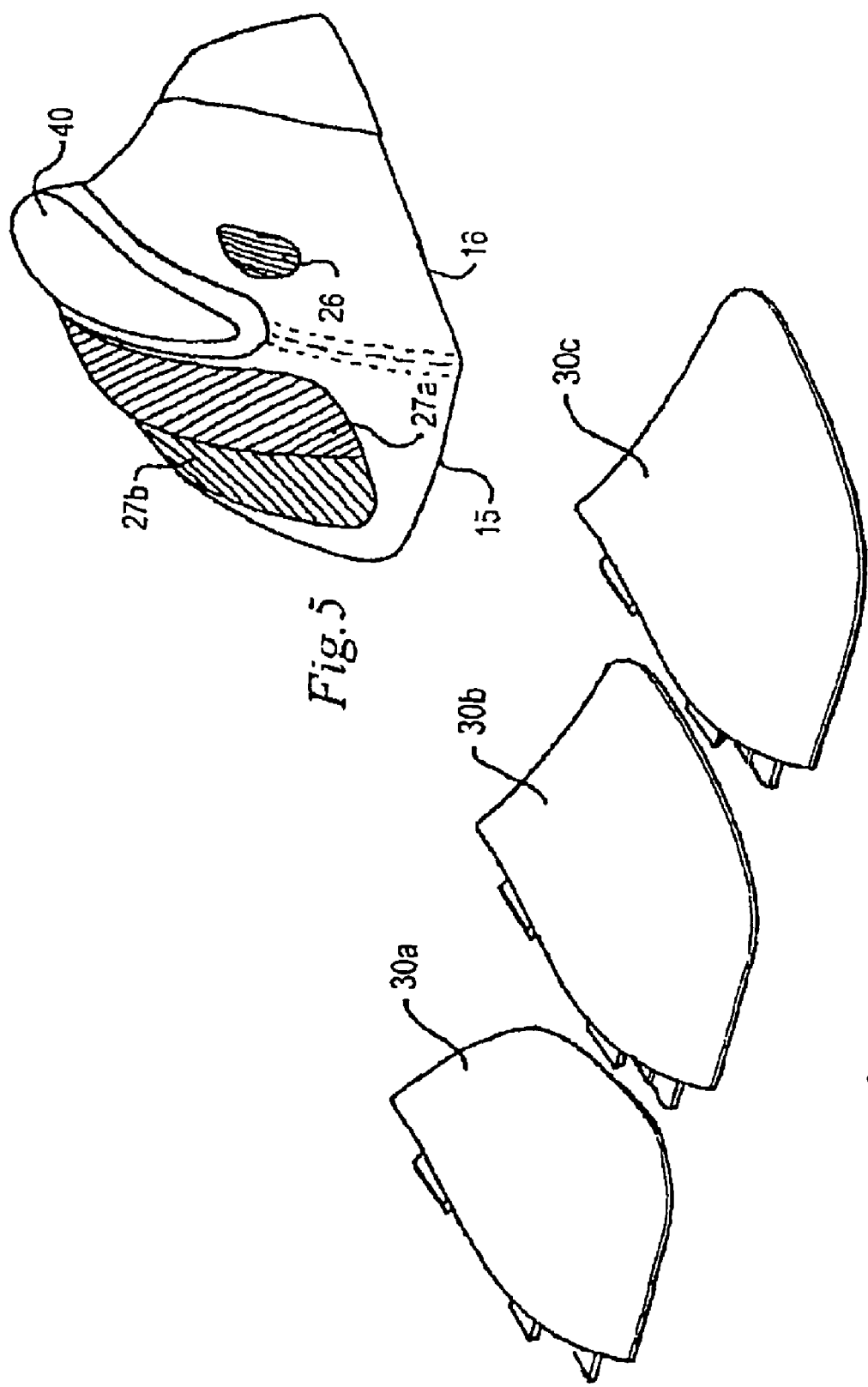

ORTHOPEDIC COMPUTER MOUSE

FIELD OF THE UTILITY MODEL

The present utility model refers to improvements made in the Orthopedic Computer Mouse designed to prevent some of the pathologies normally associated to the use of conventional type mouse devices.

DESCRIPTION OF THE PRIOR ART

The increasing occurrence of ailments associated to long-term use of computer peripherals such as keyboards and mouse devices has given rise to versions thereof intended to reduce or even to prevent conditions such as tendonitis, bursitis and carpal tunnel syndrome. On creating such versions, their authors seek to have the user place his or her hands in a manner enabling the same to avoid efforts caused by deviations from the natural, relaxed position of the hand, where such deviations require constant effort and cause discomfort, fatigue and pain in the hand and the wrist.

Specialized anatomical studies have demonstrated that the most favorable position is that which is named the "position of function", whereby the muscles of the hand and forearm are in full equilibrium: the fingers are slightly flexed at each joint; the degree of flexing is minimal at the index finger and gradually increasing towards the little finger. The thumb is in opposition and its joints are also partially flexed. Said. "position of function" preserves the natural concavity of the palm of the hand, which has an approximately hemispherical shape.

In patent document no. PI 9903113-2, published on Mar. 06, 2001, there is disclosed an Orthopedic Computer Mouse provided with adequate characteristics to obviate the possibility of pathologies, and considered "innocuous", that is, harmless in use. As described in that document, the mouse has a flat base substantially in the shape of a parallelogram with the adjacent sides positioned at angles of 75°. FIG. 1 is based on FIG. 16 of application no. PI 9903113-2 and shows said mouse in a top perspective view, where the base parallelogram comprises the distal side 15 and the proximal side 17, the left side 16 and the right side 18, assuming that the mouse is handled with the right hand. Since it is necessary to preserve the natural concavity of the palm of the hand, the central region 11 of this mouse, whereupon is supported the said palm, has. the approximate shape of a hemispherical dome. The fingers are supported on the portion of this hemispherical surface that extends towards said distal edge 15, and are accommodated in the shallow recesses 12a, 12b, 12c respectively corresponding to the index, middle and ring fingers. The distal ends of these recesses may be provided or not with control buttons, depending on the requirements of the design. In order to ensure that the hand of the user maintains a pincer position, the Orthopedic Computer Mouse is provided with a projection 14, adjacent to the left side portion of the said dome 11, which provides the separation between the index finger and the thumb, this latter fitting into the recess 13 oriented substantially parallel to the left edge 16 of the base, as may be seen in FIG. 2. Within this recess 13 there may be provided a control element (not shown in the figure), such as one ore more buttons, a trackball or a scroll disc, depending on the particular design.

Since the Orthopedic Computer Mouse was created based on the anatomical characteristics of the human hand, its effectiveness, in terms of comfort and absence of potentially harmful muscular efforts, will improve with increasingly better correspondence between its dimensions and those of the hand and fingers of the user. On the other hand, the use of a standard single size mouse might create discomfort or problems of a more serious nature, since there are a great variety of hand and fingers sizes, as much due to the physical sizes of individuals as to the differences between both sexes. However, the restrictions associated with industrial processes inhibit and/or raise the prices of the manufacture of a range of mouse devices that may correspond to the range of variance in size of the human hands and fingers.

Objectives of the Utility Model

In view of what has been set forth above, the object of the proposed utility model is to provide an arrangement that may allow adapting the mouse to a wide range of dimensions of user hands and fingers.

One other object consists in providing an arrangement whose industrial production costs are not excessively high.

Summarized Description of the Utility Model

The above objectives and others are achieved by the proposed utility model by means of the provision of a modular mouse, comprising a standard-sized body and extensions of various dimensions attachable to said body, in order to form assemblies of various sizes adaptable to a wide range of hand and fingers dimensions.

According to another characteristic of the utility model, said extensions comprise the elongating attachments and the projections.

According to an additional characteristic of the utility model, the mouse surface is textured in specifically selected regions for the purpose of avoiding slipping of the hand and excessive perspiration.

According to another characteristic of the utility model, all the control buttons, electronic components and motion sensors are housed in the said standard-sized body.

DESCRIPTION OF THE FIGURES

The details, advantages and characteristics of the proposed utility model will be better understood by means of the description of a preferred embodiment thereof and the figures referring thereto, wherein:

FIGS. 1 and 2 both show a known device that is the object of patent no. PI 9903113-2.

FIG. 3 depicts, in a partially exploded perspective view, the standard-sized body of the mouse according to the proposed utility model.

FIG. 4 depicts, in a side elevation view, two shapes of projections for the proposed mouse, among the possible shapes for the same purpose.

FIG. 5 shows, in a perspective view, the proposed mouse seen from another angle.

FIG. 6 shows three elongating attachments for the proposed mouse.

DETAILED DESCRIPTION OF THE UTILITY MODEL

Figure 7:
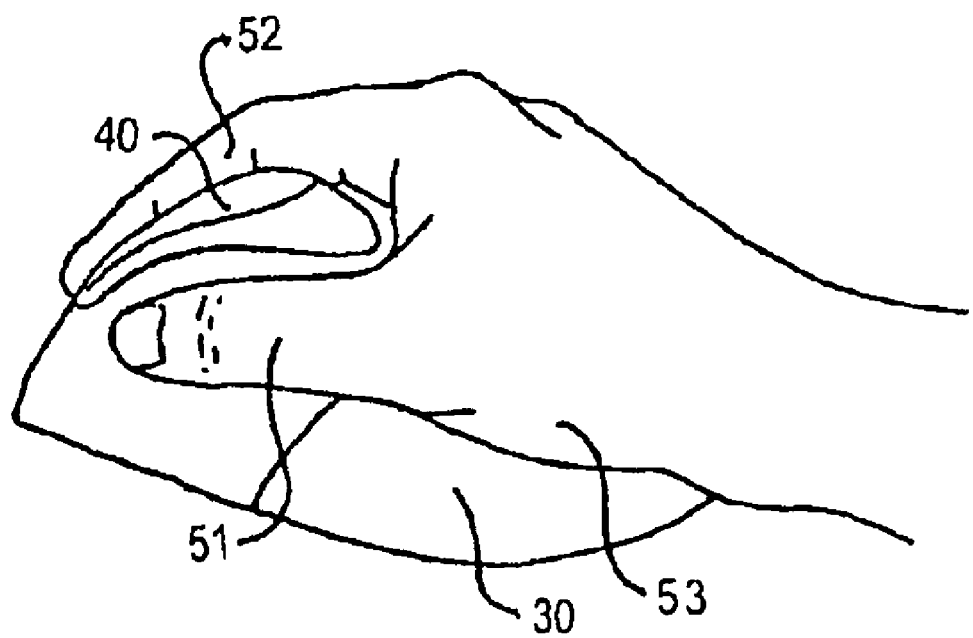
FIG. 7 shows the relative positions of the user hand and the proposed mouse while the latter is in use.

Referring now to FIG. 3, the proposed utility model comprises a body 20, molded from a thermoplastic material or an equivalent material, and provided, at the distal 15 region thereof, with a first set of coupling means 21, 22, 23, 24 that provide the guiding, engagement and attachment of the elongating attachment 30, which is attached by sliding to the said body such that the distal edge 31 thereof is juxtaposed to the abutment 25, providing an integrated assembly that adapts to the hand of the user as shown in FIG. 7. The said elongating attachment has a second set of coupling means that cooperate with the said coupling means of the first set, whereof only the tongue 32 is visible in the figure.

Still according to the utility model, the recess of the body 20 wherein is fitted the thumb is provided with one or more buttons 26, which may be substituted by a trackwheel or a trackball. This central button 26 will be functionally equivalent to the scroll disc of conventional mouse devices.

According to the principles of the utility model, the adaptation of the mouse characteristics to the hand and fingers of the user is achieved by selection of the most adequate elongating attachment and projection, among the various models available. FIG. 4 depicts in a side elevation view two interchangeable shapes of projections 41a and 41b that are provided with latching elements 42a, 42b and 42c that fit into holes (not shown) provided in the mouse body. As will be evident, the projections shown in the figure are merely illustrative, and other shapes and dimensions may be adopted according to the needs and the criteria of the project.

FIG. 5 depicts the Orthopedic Computer Mouse seen from the distal region. In this figure there may be noted that in recesses 27a and 27b corresponding to the index and middle fingers there are provided two keys that are actuated by the said fingers, which may be best observed in FIG. 8, where is shown the position of the hand while using the mouse. The said keys correspond functionally to the left and right buttons of a conventional mouse.

Similarly to the case of the projections referred above, the elongating attachments and projections are also manufactured in several sizes and shapes to match the hands and fingers of the users. In the example illustration of FIG. 6 are shown, from left to right, three versions of the elongating attachment, to wit, a small one 30a, a medium-sized version 30b and a large size version 30c. Other shapes and dimensions may be manufactured according to criteria enabling the same to accommodate the needs of a wide range of users.

There should be pointed out that both the said elongating attachments and the said projections do not house any electronic circuits or components, buttons or keys, which substantially reduces their production costs. Thus, the points of sale may carry in stock the standardized body 20, which cost is higher, and a plurality of elongating attachments 30 and projections 40, whose costs are lower when compared with the cost of the said body. This will enable the salesperson to supply a custom-sized mouse to the buyer, by means of the selection, at the time of the sale, of the elongating attachment and the projection that best correspond to the characteristics of the customer's hand and fingers.

Figure 8:
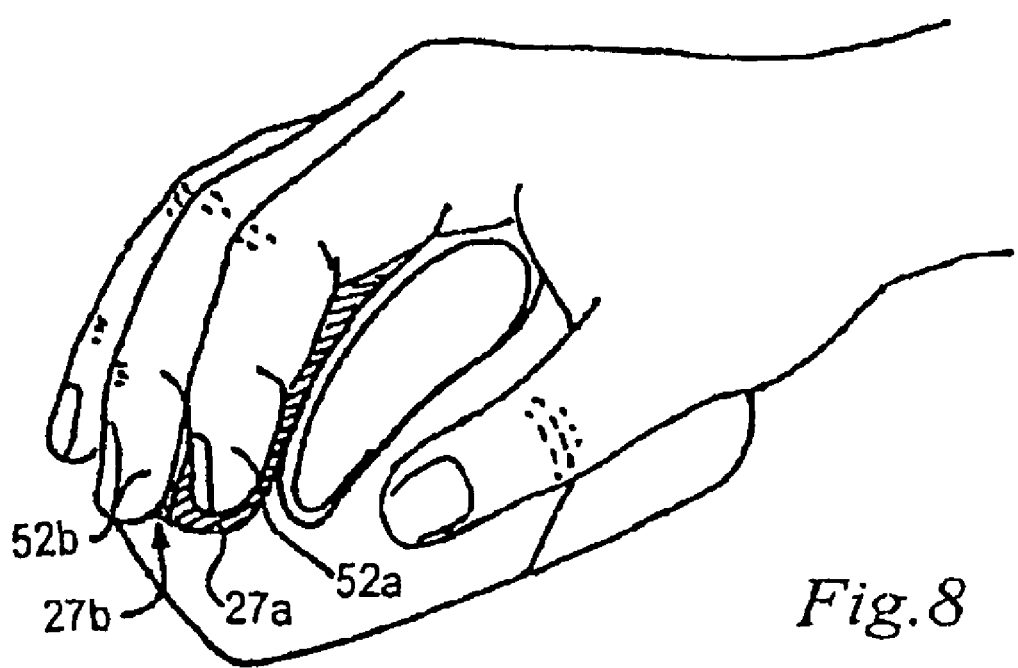
FIG. 8 depicts a second view of the user hand and the proposed mouse while in use.

In FIGS. 7 and 8 there is shown the position of the hand when using the mouse, in the case of a right-handed user. In the first figure there may be noted that the mouse is held between the thumb 51 and the other fingers 52, the pincer position being assured by the outset 40. The substantially hemispherical surface of the central portion supports the fingers in a relaxed position, while the elongating attachment 30 supports the thenar region 53 and hypothenar region (not illustrated), the thumb 51 extending to the recess (not referenced in the figure) that contains the control button 26 (not shown in the figure). FIG. 8 shows another view of the hand holding the mouse, wherein there may be observed the position of the index 52a and middle 52b fingers over the keys 27a and 27b, respectively.

In addition to the innovations relative to the shape of the mouse, the surface thereof is also textured in specifically selected regions for the purpose of avoiding that the hand of the user might slip, and to avoid excessive perspiration. These areas are: the thumb rest abutment, the rest abutments for the index and middle fingers and the whole back region of the mouse corresponding to the thenar and hypothenar eminences.

In the foregoing description there were intentionally omitted any references to the electronic circuitry housed in the mouse, as well as to the motion sensor and the means used for communication of the generated signals to the computer connected thereto, since such elements are known in the art.

Furthermore, although the description has been based on the characteristics of a mouse provided for operation using the right hand, it is obvious that the same construction characteristics may be advantageously used in a mouse designed for operation using the left hand, there being sufficient for such purpose that this mouse be provided as a mirror image of the one described hereinabove.

The invention claimed is:

1. An orthopedic computer mouse adaptable to accommodate a variety of differently dimensional user hands and fingers, which comprises:
   a hemispherical, dome-shaped body member having a distal end and a proximal end and adapted to accommodate the user's hand;
   an elongating attachment member removably attached to the proximal end of the dome-shaped body member for supporting the proximal region of the user hand, whereby the elongating attachment member is dimensionally interchangeable;
   projection members removably attached to a top surface of the dome-shaped body, said projection members being provided with recesses to accommodate at least one-half of the length of the users fingers, whereby the projection members are each dimensionally interchangeable, and
   a lateral recess provided at a side of the dome-shaped body member to accommodate the thumb of the user, said lateral recess being separated from the projection members by a raised member.

2. The orthopedic computer mouse of claim 1, wherein the elongating attachment member is attached to the proximal end of the dome-shaped body member by coupling means which extend from either or both of said members to provide slidable and juxtaposed engagement between said respective members.

3. The orthopedic computer mouse of claim 1, wherein control elements are provided in the thumb recess.

4. The orthopedic computer mouse of claim 1, wherein the projection members are individual, separate members provided for each finger and for separate attachment to the top surface of the dome-shaped body.

5. The orthopedic computer mouse of claim 1, wherein the surface of the projection member and the surface of the thumb recess are textured.

* * * * *